United States Patent
Kennett

(10) Patent No.: US 10,654,705 B2
(45) Date of Patent: May 19, 2020

(54) APPARATUS FOR AND METHOD OF TRANSFERRING CRYOGENIC FLUIDS

(71) Applicant: Richard Alan Kennett, Planegg (DE)

(72) Inventor: Richard Alan Kennett, Planegg (DE)

( * ) Notice: Subject to any disclaimer, the term of this patent is extended or adjusted under 35 U.S.C. 154(b) by 0 days.

(21) Appl. No.: 15/674,508

(22) Filed: Aug. 10, 2017

(65) Prior Publication Data

US 2019/0367354 A1    Dec. 5, 2019

Related U.S. Application Data

(63) Continuation of application No. PCT/DE2016/000046, filed on Feb. 10, 2016.

(30) Foreign Application Priority Data

Feb. 10, 2015    (DE) .................. 10 2015 001 665

(51) Int. Cl.
| | |
|---|---|
| B67D 7/32 | (2010.01) |
| F16L 37/30 | (2006.01) |
| F17C 13/02 | (2006.01) |
| F17C 13/12 | (2006.01) |

(52) U.S. Cl.
CPC ............ *B67D 7/3236* (2013.01); *F16L 37/30* (2013.01); *F17C 13/02* (2013.01); *F17C 13/12* (2013.01); *F17C 2205/037* (2013.01); *F17C 2221/011* (2013.01); *F17C 2221/012* (2013.01); *F17C 2221/014* (2013.01); *F17C 2221/016* (2013.01); *F17C 2221/033* (2013.01); *Y10T 137/87941* (2015.04)

(58) Field of Classification Search
CPC ........ F16L 37/28; F16L 37/30; B67D 7/3236; F17C 13/02; F17C 13/12; Y10T 137/87941

USPC ................ 137/614, 614.03–614.05
See application file for complete search history.

(56) References Cited

U.S. PATENT DOCUMENTS

| | | | |
|---|---|---|---|
| 5,343,906 | A | 9/1994 | Tibbals |
| 5,429,155 | A | 7/1995 | Brzyski et al. |
| 5,810,048 | A | 9/1998 | Zeiner-gundersen |
| 6,125,871 | A | 10/2000 | Drab et al. |

(Continued)

FOREIGN PATENT DOCUMENTS

| | | |
|---|---|---|
| DE | 10055104 C1 | 2/2002 |
| DE | 102004033567 A1 | 1/2006 |
| WO | 03/095883 A1 | 11/2003 |

OTHER PUBLICATIONS

International Preliminary Report for Patentability dated Aug. 17, 2017 for PCT/DE2016/000046 with partial English translation, 28 pages.

*Primary Examiner* — Kevin L Lee
(74) *Attorney, Agent, or Firm* — Dorsey & Whitney LLP

(57) ABSTRACT

The invention relates to an apparatus for transferring flammable, hazardous and/or cryogenic fluids, comprising a first coupling part and a second coupling part having a connecting and locking mechanism in order to establish a connection to the first coupling part by connecting contact surfaces comprising sealing devices, so that charge equalization can be established. Furthermore, the invention relates to a method of operating an apparatus for transferring flammable, hazardous and/or cryogenic fluids into or out of a mobile, transportable or stationary storage device such that at first charge equalization is established before the transfer process begins.

15 Claims, 2 Drawing Sheets

(56) References Cited

U.S. PATENT DOCUMENTS

| | | | |
|---|---|---|---|
| 6,156,969 A * | 12/2000 | Schutz | B65D 77/0466 174/17 LF |
| 6,202,710 B1 | 3/2001 | Dill et al. | |
| 7,469,718 B2 * | 12/2008 | Lambert et al. | A61M 16/08 137/614.04 |
| 7,565,917 B2 * | 7/2009 | Kamiya et al. | F16L 37/565 137/240 |
| 2002/0053368 A1 | 5/2002 | Blaszczyk et al. | |
| 2005/0083632 A1 * | 4/2005 | Hahn | B67D 1/0835 361/215 |

* cited by examiner

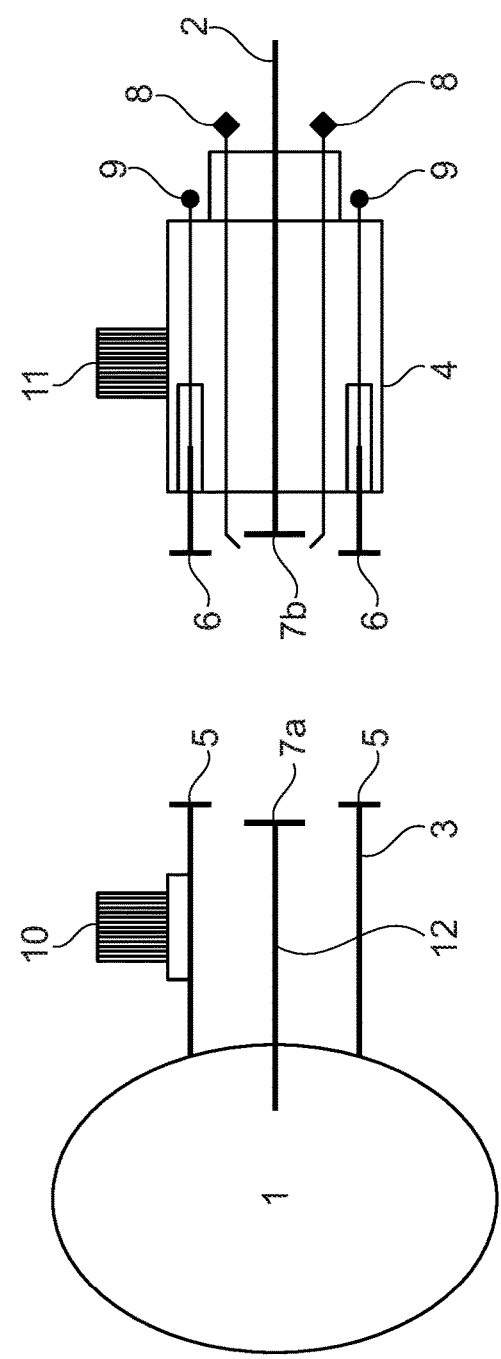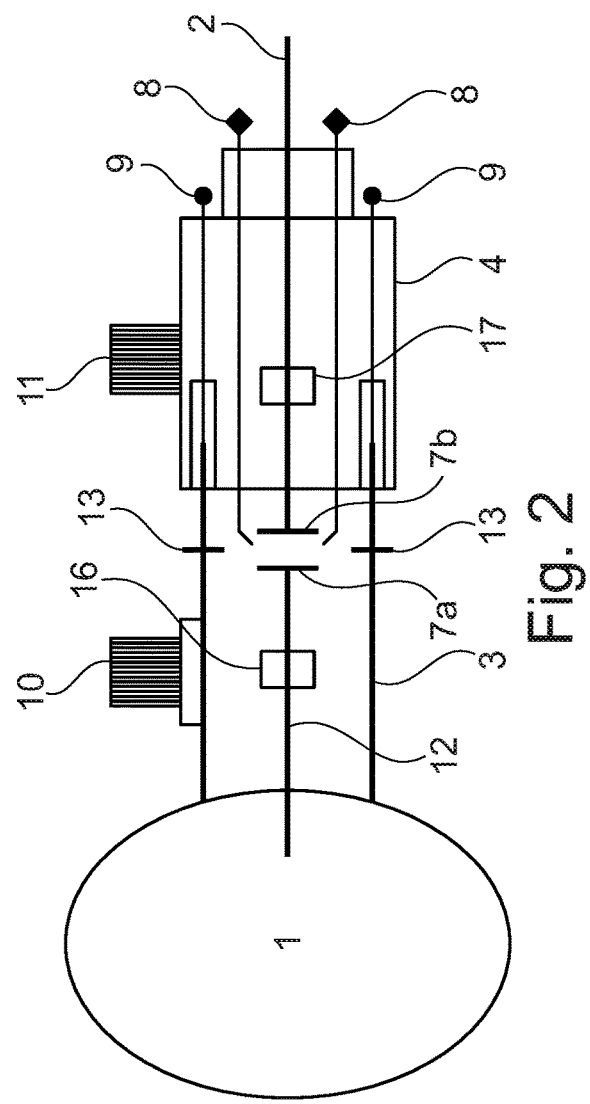

APPARATUS FOR AND METHOD OF TRANSFERRING CRYOGENIC FLUIDS

CROSS-REFERENCE TO RELATED APPLICATIONS

This application claims priority benefit of and is a Continuation Application of co-pending International Patent Application PCT/DE2016/000046, which was filed on Feb. 10, 2016. International Patent Application PCT/DE2016/000046 claimed priority benefit of German Patent Application No. 10 2015 001 665.2, which was filed Feb. 10, 2015. The entire contents of the above identified prior filed applications are hereby incorporated herein by reference.

FIELD

The invention relates to an apparatus for transferring flammable, hazardous and/or cryogenic fluids, comprising a first coupling part and a second coupling part having a connecting and locking mechanism in order to establish a connection to the first coupling part. Furthermore, a method of operating the apparatus for transferring flammable, hazardous and/or cryogenic fluids into or out of a mobile, transportable or stationary storage device is presented.

BACKGROUND

Various apparatuses for and methods of transferring cryogenic fluids are already known from the prior art. For example, U.S. Pat. No. 5,429,155 and WO 03/095883 describe couplings suited to transfer cryogenic fluids, particularly liquefied natural gas, methane, air, oxygen or nitrogen, from a stationary storage device into a mobile storage device, for example a vehicle's tank.

In one example, DE 100 55 104 C1 discloses a device for filling a tank with a combustible medium from storage container. The device comprises supply means disposed on the side of the storage container and receiving means disposed on the side of the tank for introducing the medium into the tank. There are provided potential equalization means for equalizing an electrical potential between the storage container and the tank, wherein closing means are unlocked only after the potential equalization means have been connected correctly. DE 10 2004 033567 A1 discloses a connection system for conducting electric power and at least one fluid through a wall for supplying a load by means of a supply module, wherein the supply module is on a first side and the load on a second side of the wall, comprising at least one plug contact arranged in the wall and a socket contact arranged on the supply module and associated with the plug contact. U.S. Pat. No. 5,810,048 A discloses sealing means between two coupling parts. U.S. Pat. No. 6,125,871 A discloses an assembly for transferring chemical fluids. The assembly comprises two connectors connectable with each other. When the connectors are connected with each other, a cleaning liquid may be introduced via a flush inlet of a chamber of one of the connectors and removed via a purge outlet of the chamber. U.S. Pat. No. 5,343,906 A discloses a refueling device for a vehicle, said refueling device further comprising optical transmission means. U.S. Pat. No. 6,202,710 B1 concerns a device for refueling a vehicle.

Here, it is to be noted that, above all, the vehicle has to be earthed separately in order to establish charge equalization among both storage devices or the vehicle. Usually, this is done by manually attaching and earthing cable to a metal component of the vehicle before connecting the tank coupling to the tank.

There is a risk of impurities on the contact surfaces of the couplings preventing a perfect seal, particularly in the case of cryogenic fluids. Such impurities have to be removed manually prior to the fill-up. Usually, dehumidified compressed air or nitrogen is used for this. An imperfect seal not only carries the risk of the gas being emitted but also, above all, of humidity or oxygen seeping in and thus causing icing of the valve or the formation of explosive mixtures. Icing of the valve may also damage the seal in the event of the coupling being separated too quickly.

Since both earthing and cleansing are to be performed manually prior to attaching the tank coupling, there is the risk of these steps being forgotten or executed improperly.

SUMMARY

An implementation of the present invention enables the transfer of flammable, hazardous and/or cryogenic fluids into or out of a mobile, transportable or stationary storage device by connecting two coupling parts so that sources of errors leading to accidents and damage are avoided.

In some implementations, a second coupling part is provided having at least one contact surface connectable to the first coupling part such that charge equalization can be established.

In some implementations, the apparatus is formed so that at least one contact surface, particularly 3 contact surfaces, on the second coupling part is formed so that it protrudes, particularly as a cylinder or hemisphere, and that the first coupling part comprises corresponding recesses. Thus, it is ensured that the initial contact is made at these contact surfaces and direct charge equalization is enabled when connecting both coupling parts. According to an embodiment of the inventive idea, however, the first coupling part may comprise protruding contact surfaces, and the second coupling part may comprise the corresponding recesses. It is also conceivable for the protruding contact surfaces to be movable so that protruding contact surfaces on the second coupling part, in particular, are pushed back by the complete connection of both parts following the initial contact with the first coupling part. After the end of the transfer process and the release of both coupling parts, the contact surfaces move back to the initial state so as to protrude with respect to the other surfaces, particularly the sealing surfaces, on the second coupling part.

Since the contact surfaces are subject to wear and tear, the apparatus is configured so that the contact surfaces may be replaced without having to replace the entire coupling.

In some implementations the apparatus additionally comprises, on the second coupling part, at least one opening connected to a storage device for gases, particularly compressed air or nitrogen. Preferably, the compressed air and nitrogen are dehumidified. As an alternative, however, the opening (or several openings) may also be arranged on the first coupling part. This is dependent on the fact of which apparatus the necessary gas supply can be realized more easily on. The second coupling part may comprise a channel parallel to the channel in which the fluid to be transferred is guided, in order to connect the at least one opening to the storage device for gases. Thus, the apparatus may be realized in a more compact way. What is also conceivable is a pipe-in-pipe design so that the opening forms an annular gap from which the gas flow may exit.

Advantageously, the apparatus additionally comprises at least one device for digital data transmission, particularly contactless transmission, on the second coupling part. This device for digital transmission may be a chip, for example. The digital transmission may be ensured via infrared, Bluetooth, Near Field Communication (NFC) or other transmission techniques, for example. On or in connection with the first coupling part, there is arranged a further device for digital data transmission, particularly contactless transmission, which communicates with the data transmission device of the second coupling part.

With respect to the method, the second coupling part may be brought into contact with the first coupling part so that at first the contact surfaces make contact in order to establish charge equalization before the locking mechanism connects both parts to each other and the transfer of fluids begins. By way of integrated charge equalization and/or integrated earthing, the method step which previously needed to be executed separately by the operator of the apparatus when transferring fluids can no longer be forgotten or executed improperly. Thus, hazard sources are avoided.

In some implementations, the connecting surfaces of both coupling parts are cleaned by way of a gas flow, particularly a compressed air or nitrogen flow, prior to contact of both coupling parts. Thus, one obtains a clean contact surface which is flush and can be sealed, particularly for the connecting pieces of the conduit connections for the fluid to be transferred. Thus, leakages are avoided. Neither can fluids issue, so that no economic losses, but above all no hazard to the environment are incurred, nor can contaminants enter the coupling. By avoiding contaminants, for example humidity or solids, such as dust, the risk of both coupling parts freezing together is avoided particularly in the case of cryogenic and/or compressed fluids. By using dry inert gases, such as nitrogen, in particular, the coupling parts are rendered inert, and the formation of explosive mixtures with the fluid to be transferred is prevented.

It is also possible for the gas flow to be active also after termination of the transfer process during and after the separation of the coupling parts, so that a cleansing effect of the contact surfaces also can be obtained here and potentially issuing fluid to be transferred is diluted immediately by inert gases.

When using gases nitrogen, for example, the apparatus is designed so that temperatures between −196 and +60° C., pressures of 0.1 two 10 bar or more and volume flow rates of 0.1 two 1000 l/min or more can be realized. If no integrated cleaning is used, temperatures between −263 and +60° C., pressures of 0.1 two 1000 bar or more and volume flow rates of 0.1 two 10000 l/min or more can be realized.

Advantageously, the method is executed so that cut-off valves, which prevent the emission of fluids from the separated coupling parts, can be opened or open automatically only when the locking mechanism of the coupling parts is tight and charge equalization is established.

In some embodiments, digital data transmission between the second coupling part and the storage device ensures the charge equalization to be established prior to the start of the transfer process and cut-off valves, which prevent the emission of fluids from the separated coupling parts, to be opened or open automatically only thereafter. This offers a safety advantage in that the charge equalization always is checked.

The digital data transmission also offers further monitoring and safety arrangements. Identification of the storage device may be realized. It may be ensured that the storage device suitable and/or authorized for the fluid to be transferred and that data, such as pressure and temperature, necessary for calculating the contents and filling capacity is transmitted. When pressure or temperature in the storage device change to heavily, the transfer of the fluid may be interrupted automatically or an alarm signal may be issued. Moreover, data on the quality of the fluid, particularly the fuel, may be exchanged.

The apparatus and the method may be used advantageously when transferring flammable, hazardous and/or cryogenic fluids between mobile, transportable or stationary storage devices filled with hydrogen, nitrogen, methane-containing gas, particularly natural gas or biogas, or oxygen. The first coupling part is arranged on the storage device to be filled, for example the vehicle tank or the storage tank of a filling station, for example. Correspondingly, the second coupling part is arranged preferably on the seal housing, for example on the storage device of the production facility or the tank vehicle supplying the filling stations. It goes without saying that storage devices may also be equipped with the inventive apparatus in watercraft or aircraft.

The advantages of the invention above all include that the risk of errors in the fill-up process is reduced by the direct integration of the charge equalization and of the cleansing of the contact surfaces within the coupling apparatus. In addition, the fill-up process is accelerated, as less steps are to be executed. Moreover, the digital data transmission enables identification of the storage device and a compatibility check with respect to the storage device and the medium to be transferred. Thus, it can be avoided that the wrong fluids are filled into the wrong storage devices and that dangerous mixtures or losses due to contaminated media, which have to be disposed of in an expensive way, occur.

The apparatus can be applied in the transfer of liquid, compressed and/or cryogenic fluids, such as liquefied natural gas (LNG), hydrogen, nitrogen, argon, oxygen, biogas or mixtures of gases.

BRIEF DESCRIPTION OF THE DRAWINGS

In the following, the invention is illustrated schematically and explained in greater detail on the basis of an embodiment in FIGS. 1 to 3.

FIG. 1 schematically shows the separated coupling parts.

FIG. 2 schematically shows the first step of connecting the coupling parts.

In the figures, corresponding elements are identified with identical reference numerals, wherein repeated description of such elements may be omitted.

DETAILED DESCRIPTION

Figure 3:
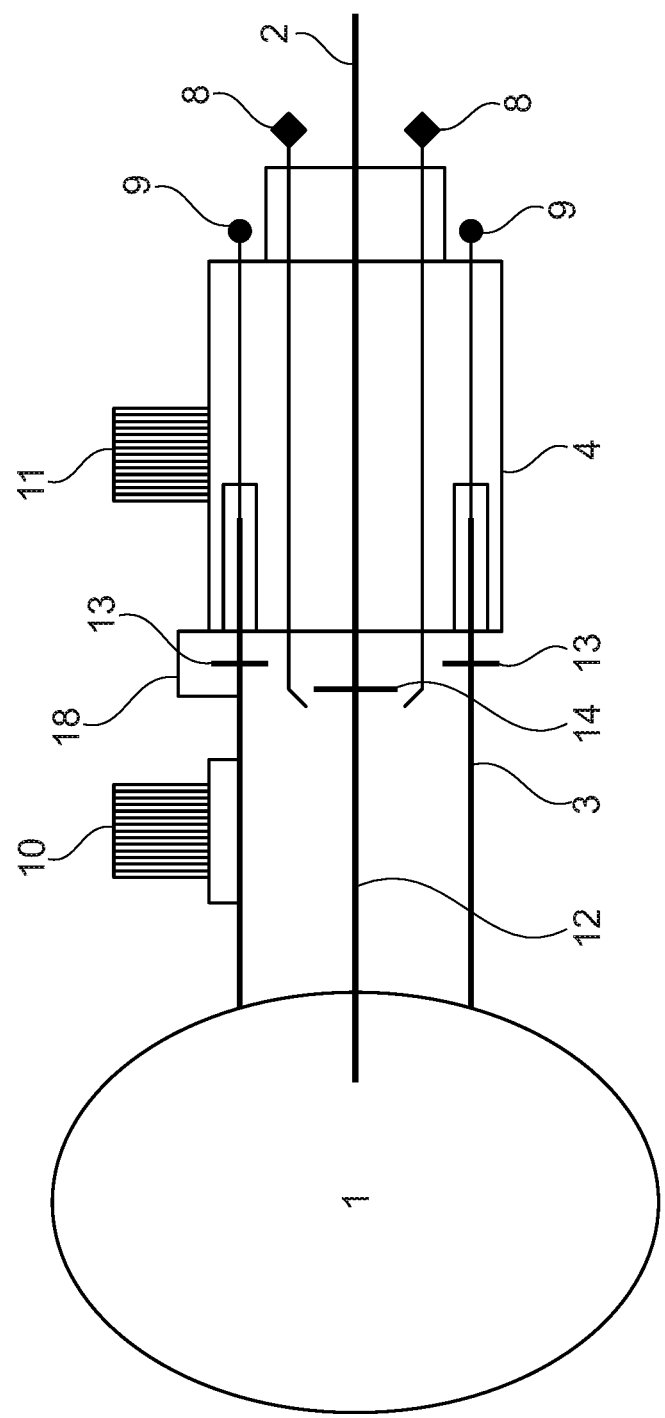
FIG. 3 schematically shows the connected coupling parts.

FIG. 1 shows a first coupling part 3 connected to a storage device 1. The second coupling part 4 is connected to a storage device or a production facility, not shown, via a conduit connection for a medium 2 to be transferred. In FIG. 1, the first coupling part 3 is separated from the second coupling part, as is usual at the beginning of a fill-up process. The first coupling part 3 comprises contact surfaces 5, exemplarily shown here as two discs, which protrude with respect to the connecting pieces 7a, 7b for the conduit connections of the medium to be transferred. The connecting piece of the first coupling part is connected to the conduit connection 12 for a medium to be transferred. The conduit connection 12 is in direct contact with the storage device 1. In the embodiment shown here, the first coupling part additionally comprises a data transmission device 10.

The second coupling part 4 comprises two contact surfaces 6 serving for charge equalization and arranged so that they can be connected to the contact surfaces 5 of the first coupling part in an accurately fitting manner. Via a line link, the contact surfaces 6 are connected to contacts 9 enabling earthing and dissipation of possible electric charges, which is not illustrated in greater detail here. The contact surfaces 6 protrude with respect to the connecting piece 7b of the conduit connection of a medium to be transferred. In addition, the embodiment presented here comprises two conduit connections 8 each comprising an opening near the connecting piece 7b and connected to a storage device, not shown, for a gas. A gas flow by means of which the contact and/or sealing surfaces of the connecting pieces 7a, 7b are cleaned streams out via the openings. In this case, the conduit connections 8 are parallel to the conduit connection 2 of the medium to be transferred. Other arrangements are possible, however. The second coupling part further comprises a data transmission device 11 connected to the data transmission device 10 of the first coupling part. The data is transmitted in a contactless manner here, for example. It is possible that the data transmission unit 10 functions as a transmitter and the data transmission unit 11 as a receiver. In case of contactless data transmission, in particular, the data transmission unit 10 may also be attached on the storage tank 1 or near the first coupling part.

FIG. 2 shows the first step for connecting the coupling parts 3 and 4. The contact surfaces 5 and 6 have been brought into contact with each other and form the connected contact surface 13. Now, charge equalization between the storage tank 1 and the first coupling part 3 as well as the second coupling part 4 and a storage device, not shown, connected thereto is possible. By means of data transmission between the data transmission devices 10 and 11, it is possible to check as to whether the charge equalization has been successful. If necessary, the signalization of the successful or failed charge equalization may be conducted optically or acoustically, for example. It is also possible for the transfer of a fluid to be enabled only when the charge equalization has been successful, for example by means of automatic control of the cut-off valves 16, 17. In FIG. 2, there is also shown that the openings of the conduit connection 8 are oriented to the two connecting pieces 7a, 7b so that the surfaces are cleaned by an issuing gas flow. However, other embodiments of the openings are possible, for example as nozzles or annular gap.

FIG. 3 shows the connected coupling parts. A locking and connecting mechanism 18 is depicted. Clamps, swivel connections or form-locked and force-locked connections are possible.

In FIG. 3, the two connecting pieces 7a, 7b are connected so that one unit 14 has been formed. It is sealed so that no fluid can issue and no contaminants from the environment can enter. What is also shown is that the contact surfaces 6 of the second coupling part 4 are pushed back into an opening provided to this end due to the complete connection of the coupling parts and no longer protrude with respect to the connecting piece. Following the separation of the coupling parts, the contact surfaces move back to the initial position. This may be done by a return spring, for example. As the contact surfaces 5 and 6 are subject to wear due to the connection and, in the case of the contact surface 6, due to the movement, these parts may be replaced separately. Furthermore, it is possible that the contact surfaces 5 on the first coupling part 3 are designed so as to be movable, instead of the contact surfaces 6.

What I claim is:

1. An apparatus for transferring liquid, compressed and/or cryogenic fluids, comprising:
    a first coupling part and
    a second coupling part, the second coupling part having a connecting and locking mechanism in order to establish a connection to the first coupling part,
    wherein the first coupling part comprises a conduit connection for the fluids to be transferred,
    wherein the conduit connection comprises a connecting piece,
    wherein the second coupling part comprises a conduit connection for the fluids to be transferred, wherein the conduit connection comprises a connecting piece,
    wherein the connecting piece of the second coupling part is connectable to the connecting piece of the first coupling part, and
    wherein the second coupling part further comprises at least one contact surface and the first coupling part comprises a contact surface, the contact surfaces being connectable for establishing charge equalization between the coupling parts, wherein via a line link, the at least one contact surface of the second coupling part is connected to contacts enabling earthing and dissipation of possible electric charges,
    wherein the second coupling part additionally comprises two conduit connections connectable to a storage device for gases, and each of the conduit connections comprises an opening being directed to the connecting piece of the second coupling part,
    wherein the openings of the conduit connections are formed as a nozzle or annular gap, and
    wherein a gas flow by means of which the contact surfaces of both coupling parts may be cleaned may exit via the openings.

2. The apparatus according to claim 1, wherein at least one contact surface on the second coupling part is formed so that the at least one contact surface protrudes and the first coupling part comprises corresponding recesses.

3. The apparatus according to claim 1, wherein the conduit connections are connected to the storage device for inert gases.

4. The apparatus according to claim 1, wherein the second coupling part additionally comprises at least one device for digital data transmission.

5. The apparatus according to claim 4, wherein a device for digital data transmission connectable to the device for digital data transmission is arranged on the first coupling part or the storage device.

6. The apparatus according to claim 1, wherein the liquid, compressed and/or cryogenic fluids comprises liquefied natural gas (LNG), hydrogen, nitrogen, argon, oxygen, biogas or mixtures of gases.

7. The apparatus according to claim 1, wherein the storage device for gases comprises a storage device for compressed air or nitrogen.

8. The apparatus according to claim 1, wherein the at least one contact surface comprises three contact surfaces.

9. The apparatus according to claim 1, wherein the at least one contact surface protrudes as a cylinder or hemisphere.

10. The apparatus according to claim 1, wherein the inert gases comprise dehumidified compressed air or nitrogen.

11. The apparatus according to claim 1, wherein the apparatus comprises at least one device for digital data transmission comprising a device for contactless transmission.

12. A method of operating an apparatus according to claim 1 for transferring flammable, hazardous and/or cryogenic fluids into or out of a mobile, transportable or stationary storage device, wherein the second coupling part is brought into contact with the first coupling part so that at first the contact surfaces contact each other in order to establish the charge equalization before the locking mechanism connects both coupling parts with each other and the transfer of fluids begins, wherein the contact surfaces of both coupling parts are cleaned by the gas flow before the two coupling parts come into contact with each other and/or the gas flow is active after termination of the transfer of fluids during and after the separation process of the coupling parts so that also a cleaning effect of the contact surfaces occurs and potentially exiting gas to be transferred is diluted by inert gases; and wherein a digital data transmission between the second coupling part and the storage device ensures the charge equalization to be established prior to the start of the transfer process and cut-off valves, which prevent the emission of fluids from the separated coupling parts, to be opened or open automatically only thereafter.

13. The method according to claim 12, wherein the gas flow is active during and after the separation process of the coupling parts.

14. The method according to claim 12, wherein cut-off valves, which prevent the emission of fluids from the separated coupling parts can be opened or open automatically only when the locking mechanism of the coupling parts is tight and charge equalization has been established.

15. The method of claim 12, wherein the gas flow comprises a compressed air or nitrogen flow.

* * * * *